United States Patent [19]

Erhan

[11] Patent Number: 4,831,107

[45] Date of Patent: May 16, 1989

[54] POLYMER PREPARATION FROM LYSINE AND A QUINONE

[76] Inventor: Semih Erhan, 2301 Cherry St., Apt. 12B, Philadelphia, Pa. 19103

[21] Appl. No.: 890,904

[22] Filed: Jul. 28, 1986

[51] Int. Cl.$^4$ .............................................. C08G 12/00
[52] U.S. Cl. ................................. 528/229; 428/474.4; 428/524; 528/125; 528/126; 528/128; 528/222; 528/328; 528/392
[58] Field of Search ............... 528/229, 222, 126, 125, 528/128, 328, 392

[56] References Cited

FOREIGN PATENT DOCUMENTS

| | | |
|---|---|---|
| 684875 | 2/1968 | Japan . |
| 7001631 | 1/1970 | Japan . |
| 7011518 | 4/1970 | Japan . |
| 9041500 | 4/1974 | Japan . |
| 9039000 | 4/1974 | Japan . |
| 139079 | 7/1959 | U.S.S.R. . |
| 231114 | 3/1969 | U.S.S.R. . |

*Primary Examiner*—Harold D. Anderson
*Attorney, Agent, or Firm*—Steele, Gould & Fried

[57] ABSTRACT

A novel class of polymers and processes used in their preparation are described. The polymers are produced by a reaction between polyfunctional amines and quinones. Some are infusible and intractable. Others are eminently suitable for the production of coatings, adhesives, insulators, etc. Some polymers, in solution in appropriate solvents adhere to metals, siliceous materials, composites with sufficient affinity to displace water. The polymers can be cured by heat or chemicals to an impervious and insoluble material that is not wetted by water.

2 Claims, No Drawings

POLYMER PREPARATION FROM LYSINE AND A QUINONE

BACKGROUND OF THE INVENTION

1. Field of the Invention

This invention relates to the preparation of a novel class of polymers some of which have an unusual combination of properties to make them function as unique coatings and adhesives.

2. Description of the Prior Art

Coatings of diverse formulations have become indispensible for the maintenance and survival of nearly every construction material used in all conceivable structures from buildings to bridges to ships, airplanes, etc. Because objects exposed to air face changes in temperature and moisture in a cyclical fashion, unprotected materials rust, crack, disintegrate without such protection. In the oceans, salt causes electrochemical corrosion and living organisms pose an additional problem of fouling. Taking this last problem as an example, one can site the efforts spanning the last couple of decades as having resulted in the development of organic biocides that are incorporated into paints and the ablative coatings and highly fluorinated polymers used in coatings. The former functions by slowly disintegrating thus removing the attached organisms through this phenomenon. The latter provides a surface that does get fouled but can be easily cleaned. Organic tin compounds being nonspecific toxic chemicals have recently been banned due to environmental concerns. Even before that they represented a solution that had to be repeated regularly, every 2–4 years, because one could incorporate only a limited amount of these compounds into the thin paint layer. Ablative coatings, too, had to be reapplied since after a number of years not much coating remained attached to the surface.

Furthermore, both ablative coatings but especially highly fluorinated coatings are very expensive. All of them can only be applied to a completely dry clean surface. The present invention offers distinct advantages even in this highly specialized field of use while providing a much broader spectrum of application possibilities in many other areas with unique advantages.

SUMMARY OF THE INVENTION

The present invention describes a novel class of polymers and a method for their production. The method consists of condensing various aliphatic and aromatic polyamines with different quinones. Depending upon the characteristics of the ingredients these polymers vary from infusible and intractable ones to those that are tacky, flexible, brittle. Some can be used as adhesives and coatings. They are also capable of forming fibers from melt as well as solution. Most are curable with heat and chemicals. Before curing they are soluble in ethanol, acetone, DMSO but insoluble in water and ethyl ether. They can be applied by dipping, spraying, brushing and melt coating. Once cured they are insoluble in solvents and impervious to water, salt water, boiling and autoclaving. They are non-wettable by water and hence ice too does not adhere to them. They can displace water from surfaces of metals, siliceous and composite materials, including dripping wet rusted steel surfaces.

DESCRIPTION OF THE PREFERRED EMBODIMENTS OF THE INVENTION

The procedure of the present invention consists of a series of operations, generally as follows:

1. Polyamines are dissolved in ethanol, acetone or their mixtures with water.
2. Quinones comprising o- and p-benzoquinone, naphthaquinones and anthraquinones or quinone precursor diphenols are dissolved in ethanol or other appropriate solvents. Oxidation of diphenols can be effected by air, oxidizing agents or enzymes.
3. The reactant solutions are mixed in a mol ratio of 10:1 to 1:10 and refluxed 3–8 hours.
4. The solvent is removed.
5. The product is washed with water until wash water is clear.
6. The washed product is dried in vacuo at 30°–60° C. The product can be chemically modified with reactive moieties which selected from a group comprising of epoxides, phenolies, urethanes, heterocyclics, polyamides and polysulfones can then be used to graft other polymers onto the product.
7. The product is dissolved in acetone or ethanol and applied either by dipping, spraying or brushing. The product can also be used to spin fibers from solution or melt.
8. The dried panel is cured either by heat or chemically, using compounds from a group comprising quinones and aliphatic or aromatic amines. Heating can be effected in an oven at 125°–175° C. for 1 hour or by an IR lamp for 20 minutes.

1. Preparation of the product of Jeffamine D400 and p-benzoquinone 16.0 g (0.04 moles) of Jeffamine D400 was dissolved in 50 ml ethanol. To this solution, in a round bottomed flask equipped with a reflux condenser, was added 6.48 g (0.06 moles) of p-benzoquinone in 50 ml ethanol. The mixture was refluxed on a water bath for 3 hours, the ethanol was removed in a rotary evaporator and the remaining syrup was washed, first with cold water, then with hot water, after dissolving the syrup in acetone, until the wash water was colorless (about 5l of water altogether). The residue was dried in a vacuum oven at 50° C. for 4–5 hours. The polymer was soluble in ethanol, acetone, DMSO and insoluble in water and ether.

2. Preparation of the product of 1,3 bis(3-aminophenoxy)benzene and p-benzoquinone 2.92 g (0.01 mole) of 1,3 bis(3-aminophenoxy)benzene and 3.24 (0.03 moles) of p-benzoquinone were dissolved in 100 ml ethanol. The mixture was refluxed for 3 hours during which the product precipitated. The product was washed with warm ethanol and dried at 50° C. in vacuo for over 3 hours. The product is soluble in DMSO, dimethylacetamide and insoluble in water, ethanol and acetone. It softens at 140° C. and forms a liquid melt at 155° C. In TGA the product loses 5% of its weight at 400° C.

3. Preparation of the product of 4,4 diaminodiphenyl methane and p-benzoquinone 3.96 g (0.02 moles) of 4'4'diaminodiphenylmethane and 3.24 g (0.03 moles) of p-benzoquinone were dissolved in ethanol and refluxed for 3 hours. The brown precipitate that forms was filtered and washed with ethanol. The brown powder melts at 178° C. Its inherent viscosity is 0.0645.

4. Preparation of the product of L-lysine and p-benzoquinone 1 m moles of L-lysine and 3 m moles of p-benzoquinone were dissolved in ethanol:water=70:30 and refluxed for 5 hours during which a black precipitate separated. The precipitate was washed with ethanol, acetone and water to remove traces of lysine and hydroquinone. It is insoluble in all organic solvents except hexafluoro acetone and concentrated $H_2SO_4$. In TGA it loses 30% of weight at 400° C.

5. Application of the polymer I as a coating

A 20% solution was prepared in acetone and sprayed on aluminum, steel, glass, composite panels. They were allowed to dry and either placed in an oven for 1 hour at 150° C. or heated with an IR lamp for 20 minutes at a distance of 3 inches.

The product of the reaction between Jeffamine 203 and p-benzoquinone (2:3) which melts between 60°–70° C. has been used to draw fibers, by hand. The fibers are brittle, resembling glass fibers.

The present invention describes:

a. a procedure for the production of a novel class of polymers, b. the characteristics of these polymers, especially those that are suitable for producing unique coatings.

What is claimed is:

1. A process for preparing a polymer having the characteristic of displacing water from wet, rusty metal surfaces and being insoluble in solvents and impervious to water, said process comprising refluxing lysine with a quinone and recovering the polymer formed.

2. The process of claim 1 wherein the quinone is o-benzoquinone, naphthaquinone or anthraquinones.

* * * * *